(12) United States Patent
Matsumoto et al.

(10) Patent No.: US 9,840,028 B2
(45) Date of Patent: Dec. 12, 2017

(54) CLEAVING METHOD FOR A GLASS FILM

(75) Inventors: Yasuhiro Matsumoto, Shiga (JP); Koichi Mori, Shiga (JP); Hiroshi Naruse, Shiga (JP); Michiharu Eta, Shiga (JP); Hiroki Mori, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 13/195,178

(22) Filed: Aug. 1, 2011

(65) Prior Publication Data
US 2012/0024928 A1   Feb. 2, 2012

(30) Foreign Application Priority Data
Aug. 2, 2010 (JP) ................... 2010-173854

(51) Int. Cl.
 B28D 1/22    (2006.01)
 C03B 35/18   (2006.01)
 C03B 33/09   (2006.01)

(52) U.S. Cl.
 CPC ............ B28D 1/221 (2013.01); C03B 33/091 (2013.01); C03B 35/189 (2013.01); *Y02P 40/57* (2015.11); *Y10T 225/12* (2015.04)

(58) Field of Classification Search
 CPC ..... B28D 1/221; C03B 35/189; C03B 33/091; C03B 35/162; C03B 35/183;
(Continued)

(56) References Cited

U.S. PATENT DOCUMENTS 3,543,979 A * 12/1970 Hamer et al. ................ 225/2
3,871,855 A *  3/1975 Frank .................... C03B 23/033
                                              65/245
(Continued)

FOREIGN PATENT DOCUMENTS

CN    1414893    4/2003
CN    1435291    8/2003
(Continued)

OTHER PUBLICATIONS

International Preliminary Report on Patentability and Written Opinion of the International Searching Authority dated Feb. 14, 2013 in International (PCT) Application No. PCT/JP2011/067609.
(Continued)

*Primary Examiner* — Jonathan Riley
(74) *Attorney, Agent, or Firm* — Wenderoth, Lind & Ponack, L.L.P.

(57) ABSTRACT

Provided is a cleaving method for a glass film (G) including: cleaving, during conveyance of the glass film (G) in a predetermined direction, the glass film (G) continuously along a preset cleaving line (8) extending in a predetermined conveying direction (a) by a thermal stress generated through localized heating performed along the preset cleaving line (8) and through cooling of a locally heated region (H); dividing the glass film (G) in a width direction of the glass film (G); diverting, after the dividing, adjacent divided glass films (10), which are obtained by the dividing, so that the adjacent divided glass films (10) are separated in a front and rear direction of the adjacent divided glass films; and forming a predetermined widthwise clearance between the adjacent divided glass films after the dividing of the glass film (G) and before the diverting of the adjacent divided glass films (10).

9 Claims, 7 Drawing Sheets

(58) Field of Classification Search
CPC .............. C03B 23/025; C03B 23/0252; C03B 23/0254; C03B 35/161; C03B 35/166; B65G 49/06; B65G 49/061; B65G 49/063; B65G 49/064; B65G 39/12; B65G 39/18; Y10T 225/12; Y10T 225/14; Y10T 225/304; Y10T 225/307; Y10T 225/336; Y10T 225/343
USPC .............. 225/2, 3, 93.5, 94, 98, 99; 65/370.1
See application file for complete search history.

(56) References Cited

U.S. PATENT DOCUMENTS

| | | | | |
|---|---|---|---|---|
| 3,929,441 | A * | 12/1975 | Frank | C03B 23/033 65/106 |
| 3,932,726 | A * | 1/1976 | Verheyen et al. | 219/121.67 |
| 4,018,372 | A * | 4/1977 | Insolio | 225/2 |
| 4,139,359 | A * | 2/1979 | Johnson et al. | 65/107 |
| 4,218,232 | A * | 8/1980 | Wilhelm | C03B 23/0254 65/106 |
| 4,311,509 | A * | 1/1982 | Reader | B65G 39/04 492/40 |
| 5,871,134 | A | 2/1999 | Komagata et al. | |
| 5,992,180 | A * | 11/1999 | Tsuchiya | C03B 23/0252 198/463.2 |
| 6,186,384 | B1 * | 2/2001 | Sawada | C03B 33/091 219/121.61 |
| 6,363,753 | B1 * | 4/2002 | Yoshizawa et al. | 65/287 |
| 6,502,423 | B1 * | 1/2003 | Ostendarp et al. | 65/29.14 |
| 6,800,831 | B1 | 10/2004 | Hoetzel | |
| 2003/0146197 | A1 | 8/2003 | Jeon | |
| 2003/0159469 | A1 * | 8/2003 | Nemugaki | C03B 23/0254 65/253 |
| 2007/0157671 | A1 * | 7/2007 | Thellier | C03B 23/0252 65/106 |
| 2007/0169849 | A1 * | 7/2007 | Yahagi et al. | 144/366 |
| 2007/0228100 | A1 * | 10/2007 | Gonoe | 225/1 |
| 2008/0035611 | A1 | 2/2008 | Kuno et al. | |
| 2009/0229309 | A1 * | 9/2009 | Nomura et al. | 65/106 |
| 2009/0230102 | A1 * | 9/2009 | Soyama | B28D 1/221 219/121.69 |
| 2011/0113830 | A1 * | 5/2011 | Abramov | B23K 37/003 65/105 |
| 2011/0177290 | A1 * | 7/2011 | Tomamoto et al. | 428/142 |
| 2011/0177325 | A1 * | 7/2011 | Tomamoto | B65H 18/28 428/332 |
| 2011/0177347 | A1 | 7/2011 | Tomamoto et al. | |
| 2011/0192878 | A1 | 8/2011 | Teranishi et al. | |
| 2011/0200812 | A1 | 8/2011 | Tomamoto et al. | |

FOREIGN PATENT DOCUMENTS

| | | |
|---|---|---|
| CN | 101200024 | 6/2008 |
| EP | 1 775 059 | 4/2007 |
| JP | 49-75622 | 7/1974 |
| JP | 8-231239 | 9/1996 |
| JP | 09-052725 | 2/1997 |
| JP | 2000-335928 | 12/2000 |
| JP | 2007-260749 | 10/2007 |
| JP | 2007-301624 | 11/2007 |
| JP | 2010-105900 | 5/2010 |

OTHER PUBLICATIONS

International Search Report dated Nov. 1, 2011 in corresponding International (PCT) Application No. PCT/JP2011/067609.
Chinese Office Action dated Aug. 5, 2014 in corresponding Chinese Patent Application No. 201180037601.4 (with partial English Translation).
Extended European Search Report dated Nov. 14, 2013 in corresponding European Patent Application No. 11814613.3.

* cited by examiner

CLEAVING METHOD FOR A GLASS FILM

TECHNICAL FIELD

The present invention relates to a technology for cleaving and dividing, during conveyance of a glass film, the glass film in a width direction by a thermal stress generated through localized heating performed along a preset cleaving line extending in the conveying direction and through cooling of a region heated by the localized heating.

BACKGROUND ART

As is well known, flat panel displays (FPDs) have become mainstream as image display devices in recent years, the FPDs being typified by a liquid crystal display, a plasma display, an OLED display, and the like. Further, reducing the weight of those FPDs has been promoted. Therefore, currently, thinning of glass substrates used for the FPDs (forming the glass substrates as glass films) is promoted.

Further, there is a growing use of an OLED as a plane light source, such as a light source for interior illumination, which emits only monochrome (for example, white) light, unlike a display that uses TFTs to blink light of three fine primary colors. Further, when an illumination device of this type includes a glass substrate having flexibility, a light-emitting surface is freely deformable. Therefore, from the viewpoint of ensuring sufficient flexibility, there is also promoted further thinning of the glass substrate to be used for the illumination device.

In this context, generally employed techniques for cleaving the glass substrates used for the FPDs, the illumination device, and the like include cleaving the glass substrate with a bending stress generated with respect to a scribe line formed at a predetermined depth in a surface of the glass substrate along a preset cleaving line.

However, it is significantly difficult to form the scribe line with respect to the glass substrate thinned to become a state of a glass film. Therefore, it is difficult to employ such a method of cleaving the glass substrate with a bending stress. Further, defects formed in cleaved surfaces (for example, lateral cracks) may cause a problem of marked deterioration in strength of glass.

In addition, when the glass film is required to be continuously cleaved while being successively conveyed, there is also a problem that it is difficult to continuously cause a bending stress to act on the scribe line formed with respect to the glass film.

As a countermeasure, instead of the cleaving method for a glass film, in which the above-mentioned bending stress is used, cleaving methods for a glass film, in which a thermal stress is used, are currently employed.

Specifically, as described in Patent Literature 1, there is proposed a method in which widthwise end edge portions of a belt-like flat glass are locally heated by a laser and cooled by a cooling device so as to generate a thermal stress, and the end edge portions are continuously cleaved by the thermal stress thus generated.

Further, according to Patent Literature 1, an advancing direction of the end edge portions divided from a body of the flat glass (available glass portion) as a result of cleaving the flat glass is changed perpendicularly downward in a horizontal zone. The end edge portions are cleaved in width directions at lower ends thereof to be discarded, and the available glass portion of the flat glass is conveyed in a horizontal direction as it is without being changed in advancing direction. After that, the available glass portion is cleaved in a width direction by a predetermined length. In this way, glass sheets as products are obtained.

Meanwhile, according to Patent Literature 2, a continuous glass ribbon is cut along predetermined lines by a thermal stress generated by application of a laser, and end edge portions of the glass ribbon thus cut are rotationally supported by a plurality of rollers and conveyed in a direction of being gradually spaced apart from a main portion of the glass ribbon toward a widthwise outer side. In this way, the end edge portions and the main portion are separated from each other.

CITATION LIST

Patent Literature 1: JP 2000-335928 A
Patent Literature 2: JP 49-75622 A

SUMMARY OF INVENTION

Technical Problems

However, when the cleaving method described in Patent Literature 1 is employed, there is a risk that, of a plurality of divided glass films obtained by cleaving, one divided glass film and another divided glass film, which are adjacent to each other, interfere with each other. Specifically, as illustrated in FIG. 11, when one divided glass film 10 and another divided glass film 10, which are adjacent to each other, are each diverted in a manner of being separated into a front and rear direction thereof, for example, for the purpose of being rolled into roll shapes, cleaved surfaces 11 of both the divided glass films 10 are significantly close to each other at a diversion start position (in other words, separation start position). Thus, the cleaved surfaces 11 inevitably interfere with each other, for example, by rubbing against each other (part indicated by cross-hatching in FIG. 11). When such interference occurs, minute defects occur in the cleaved surfaces 11 interfering with each other, and there arises a risk that the defects cause a glass film G to be more liable to suffer from breakage. Alternatively, there arises a risk that the defects lead to deterioration in strength of the glass film G.

As described in Patent Literature 2, when the end edge portions of the glass ribbon after cutting are separated from the main portion of the glass ribbon in a manner of being pulled toward the widthwise outer side, the main portion being adjacent to the end edge portions, the problem of the interference can be avoided. However, when this method is employed as a separating method for the glass film cleaved by the technique described in Patent Literature 1, because glass is a brittle material, there is a high risk that stress other than the thermal stress generated at the time of laser cleaving is generated at a separation start position. Thus, the stress generated by the separating work has an influence in a form of being added to the thermal stress generated at the separation start position. As a result, there arises a risk that cleaving of the glass film becomes unstable.

In view of the above-mentioned circumstances, a technical object to be achieved of the invention described in this specification is to provide a cleaving method for a glass film, by which the stable cleaving work with respect to the glass film can be continuously performed while interference between the cleaved surfaces is avoided.

Solution to Problems

The above-mentioned problems may be solved by a cleaving method for a glass film according to the present invention. That is, the cleaving method for a glass film includes: cleaving, during conveyance of a glass film in a predetermined direction, the glass film continuously along a preset cleaving line extending in the predetermined conveying direction by a thermal stress generated through localized heating performed along the preset cleaving line and through cooling of a region heated by the localized heating; dividing the glass film in a width direction of the glass film; diverting, after the dividing, adjacent divided glass films, which are obtained by the dividing, so that the adjacent divided glass films are separated in a front and rear direction of the adjacent divided glass films; and forming a predetermined widthwise clearance between the adjacent divided glass films after the dividing and before the diverting.

Note that, the phrase "width direction" means a direction along a front surface and a rear surface of the glass film and orthogonal to the predetermined conveying direction of the glass film. Similarly, the phrase "predetermined widthwise clearance" means a widthwise clearance which appears in plan view of and between a pair of the divided glass films that have become adjacent to each other as a result of the dividing in the width direction by the cleaving. Further, a size of the clearance is not particularly limited as long as both the adjacent divided glass films do not substantially interfere with each other during conveyance after the dividing. Specifically, in plan view as describe above, it suffices that the size of the clearance is 0.02 mm or more, preferably 0.05 mm or more, more preferably 0.1 mm or more.

According to the above-mentioned method, the divided glass films adjacent to each other in the width direction are conveyed in the predetermined conveying direction under a state in which the cleaved surfaces of the adjacent divided glass films are spaced apart from each other by a predetermined distance. Thus, it is possible to significantly reduce a risk that the cleaved surfaces of the adjacent divided glass films come into contact with each other, for example, by rubbing against each other, and hence to avoid interference between the cleaved surfaces as much as possible, the interference inducing occurrence of defects. Thus, it is possible to suppress occurrence of minute defects in the adjacent divided glass films during the conveyance after the dividing, and hence to reduce a risk that existence of the minute defects leads to breakage of the adjacent divided glass films. Further, the forming of the predetermined clearance is carried out after the glass film is divided by the cleaving and before the adjacent divided glass films are diverted to be separated into the front and rear direction. Thus, unlike conventional cases, it is possible to avoid the stress generated by pulling the adjacent divided glass films toward the widthwise outer side from reaching the cleaving start position substantially. Thus, the glass film can be continuously and stably divided by cleaving.

In this context, various techniques can be employed as a method of forming the predetermined widthwise clearance at a position at which the glass film is cleaved, an example of which includes a technique of forming the predetermined widthwise clearance by curving at least one of the adjacent divided glass films along a width direction thereof. A belt-like flat glass, which is thinned to an extent of being called a glass film, has reasonable flexibility in a width direction thereof even when being relatively narrow, and hence can be curved along the width direction. Thus, in this case, when the at least one of the adjacent divided glass films is deformed along the width direction into a concave shape or a convex shape by being curved as described above, widthwise end portions thereof move toward a widthwise central region (refer to FIG. 4 below). In this way, the predetermined widthwise clearance can be formed. Further, the cleaved surface of the at least one of the adjacent divided glass films, which has undergone curving deformation, are changed in direction in accordance with the curving deformation. Thus, unfavorable interference between the cleaved surfaces, such as rubbing, is more easily avoided. Further, after a phase in which there is a risk of the interference between the cleaved surfaces, by canceling the curved state, the front surface and the rear surface of the at least one of the adjacent divided glass films return to an original flat state. Thus, post processes such as rolling into a roll can be smoothly performed.

In this case, the at least one of the adjacent divided glass films may be curved along the width direction by being supported by a roller having different outer diameter dimensions depending on widthwise positions. Alternatively, a partial region in the width direction of the at least one of the adjacent divided glass films may be supported by a roller so that the at least one of the adjacent divided glass films is curved along the width direction. When the at least one of the adjacent divided glass films is curved along the width direction as described above by being supported by the rollers, it is unnecessary to provide specific means for imparting a curving force separately from the conveyance means. Further, when the partial region in the width direction of the at least one of the adjacent divided glass films is supported by the roller as described later, the roller is prevented from unnecessarily coming into contact with a surface of a glass film. As a result, qualities of the glass film (surface accuracy and the like) can be maintained.

Further, in a case where the partial region in the width direction of the at least one of the adjacent divided glass films is partially supported by the roller as described above, only the widthwise end portions of the at least one of the adjacent divided glass films may be supported by a roller. Such supporting enables the at least one of the adjacent divided glass films to be naturally curved along the width direction through distortion by its own weight.

Hereinabove, description is made of a case where at least one of the adjacent divided glass films is curved along the width direction in order to form the widthwise clearance. In this context, as a matter of course, other methods can be employed.

For example, the predetermined widthwise clearance may be formed by subjecting the cleaved glass film to thermal deformation. This method enables the predetermined widthwise clearance to be formed without applying any external force at all to the adjacent divided glass films while conveying the adjacent divided glass films in the predetermined conveying direction. The thermal deformation is imparted by at least one of thermal expansion and thermal shrinkage along with at least one of the heating and the cooling. Thus, the predetermined widthwise clearance can be formed, with the adjacent divided glass films being in a flat state. Further, unlike the means using curving, a size of the widthwise clearance can be adjusted only with a temperature difference. Thus, the method using thermal deformation is advantageous also in being performed without dimensional restrictions of the glass film, such as a restriction on a ratio of a widthwise dimension with respect to a dimension in a thickness direction.

Further, as described hereinabove, when the adjacent divided glass films are diverted after the predetermined widthwise clearance is formed, the diversion start position may be separated by a distance 50 times or more as large as a thickness dimension of the glass film from the cleaving start position. The cleaving of this type is performed for cutting the glass film with use of continuous propagation of an initial crack through cooling the region that has been locally heated previously. In this context, when the diversion start position of the adjacent divided glass films (in other words, position at which the separation work is started) is close to the cleaving start position, a curving stress generated in the adjacent divided glass films at the time of the diverting reaches the cleaving start position. As a result, there arises a risk that the cleaving work cannot be accurately performed owing to addition of stress other than the thermal stress generated at the time of laser cleaving. However, when the spacing distance is secured, failures of this type can be avoided, and the cleaving can be stably performed.

Alternatively, the adjacent divided glass films that have undergone the diverting may be rolled into roll shapes. In this case, when the widthwise clearance is formed in a region between the cleaving start position and the diversion start position, both the adjacent divided glass films can be rolled into roll shapes while avoiding interference between the cleaved surfaces.

Advantageous Effects of Invention

As described hereinabove, according to the present invention, it is possible to provide a cleaving method for a glass film, by which the stable cleaving work with respect to the glass film can be continuously performed while interference between the cleaved surfaces is avoided.

DESCRIPTION OF EMBODIMENTS

Hereinbelow, embodiments of the present invention are described with reference to the accompanying drawings. Note that, in the following embodiments, an object is assumed as a glass film having a thickness of 300 μm or less, preferably 200 μm or less, more preferably 100 μm or less, which is to be used for a FPD, an OLED illumination device, a solar cell, or the like. Further, for ease of understanding of the following description related to the present invention, in the accompanying drawings, the thickness of the glass film is exaggerated.

Figure 1:
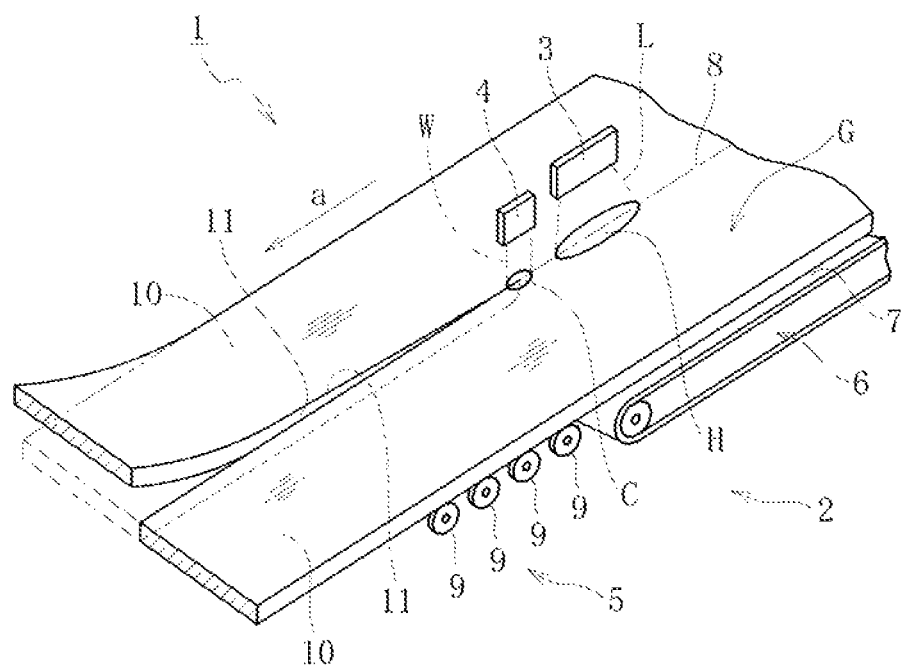
FIG. 1 A schematic perspective view of a part of a cleaving apparatus for carrying out a cleaving method according to a first embodiment of the present invention.

FIG. 1 is a schematic perspective view of a cleaving apparatus for carrying out a cleavingmethod for a glass film according to a first embodiment of the present invention. The cleaving apparatus 1 mainly includes conveyance means 2 for conveying a glass film G toward a predetermined conveying direction "a", locally heating means 3 for performing localized heating by applying a laser L to the glass film G placed in a lateral posture (for example, horizontal posture) on the conveyance means 2 from a front surface side of the glass film G, cooling means 4 for jetting cooling water W on a locally heated region H heated by the locally heating means 3 from the front surface side of the glass film G, and clearance forming means 5 described below.

Note that, in this embodiment, a carbon dioxide laser is used as the locally heating means 3, but alternatively, there may be used means capable of performing another type of localized heating such as heating with a heating wire or hot air blast. Further, the cooling means 4 jets the cooling water W as the coolant using an air pressure or the like. In this context, the coolant may include a cooling liquid other than the cooling water, a gas such as air or an inert gas, a mixture of a gas and a liquid, a mixture of a solid such as solid carbon dioxide or ice and the gas and/or the liquid, or the like.

The conveyance means 2 is formed of a conveyor 6 for supporting and conveying the glass film G. A conveyor belt 7 of the conveyor 6 is driven in a direction of conveying the glass film G into the predetermined conveying direction "a" along a preset cleaving line 8. Note that, an outer surface of the conveyor belt 7 may be used as a support surface for holding the glass film G by attraction or the like. Further, the glass film G is not necessarily supported over an entire widthwise region by the conveyor belt 7 (conveyor 6). For example, although not shown, the glass film G may be supported at widthwise end portions by a pair of the conveyors 6 so that a predetermined space is formed on a rear surface side of the preset cleaving line 8 of the glass film G over an entire conveying direction of the conveyor 6. This is because the predetermined space thus formed suppresses thermal efficiency from being reduced by the conveyor belt 7 which absorbs thermal energy generated by heating with the locally heating means 3 and cooling with the cooling means 4.

Figure 4:
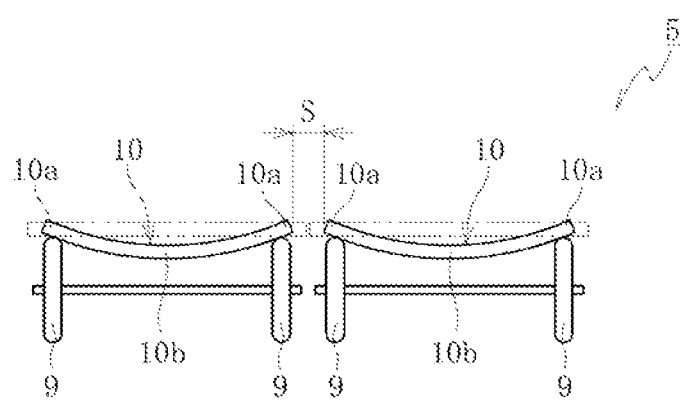
FIG. 4 A main-part sectional view illustrating one example of a step of forming a predetermined widthwise clearance at a cleaving position of the glass film after the glass film is divided by the cleaving method according to the first embodiment.

In this embodiment, the clearance forming means 5 includes a plurality of conveying rollers 9, and the plurality of conveying rollers 9 constitute the conveyance means 2 as a roller conveyor for the glass film G together with the conveyor 6. Specifically, the uncleaned glass film G is conveyed in the conveying direction "a" while being supported by the conveyor 6 including the conveyor belt 7, and the glass film G having undergone cleaving (divided glass films 10) is conveyed in the same direction by the roller conveyor formed of the plurality of conveying rollers 9. In this context, as illustrated in FIG. 4, the plurality of conveying rollers 9 are provided for supporting the divided glass films 10 obtained by cleaving. For example, as in this illustration, both widthwise end portions of each of the divided glass films 10 are supported by two conveying rollers 9. In other words, the conveying rollers 9 twice as many as the divided glass films 10 are aligned in one row in widthwise cross-section of the glass film G, and the plurality of (four in this illustration) conveying rollers 9 aligned in the one row in widthwise cross-section of the glass film G are arranged in one or a plurality of rows (four rows in this illustration) along the conveying direction "a".

In the cleaving apparatus 1 structured as described above, the conveyor belt 7 of the conveyor 6 is driven in a predetermined direction, and the glass film G is conveyed in the predetermined conveying direction "a". With this, prior to jetting of the cooling water W from the cooling means 4, scanning with a laser L applied from the locally heating means 3 is performed from one end portion side of the preset cleaving line 8 of the glass film G. In this way, the locally heated region H is formed at a position to which the laser L has been applied, and a locally cooled region C is formed at a position to which the locally heated region H conveyed by a predetermined distance along the conveying direction "a" has come (in other words, position in the locally heated region H to which the cooling water W is supplied). In this case, for example, although not shown, when an initial crack is formed in advance on the preset cleaving line 8 at one end portion in a longitudinal direction of the glass film G, the initial crack is propagated by a thermal stress generated at the time of formation of the above-mentioned locally heated region H and locally cooled region C. In this way, cleaved surfaces 11 are formed on the preset cleaving line 8 to pass from the front surface to the rear surface of the glass film G, and the glass film G is continuously cleaved along the preset cleaving line 8 (what is called full-body cleaving). Further, the glass film G is cleaved with the flatness thereof being maintained, and hence precise cleaving work can be performed while a distance between the glass film G and the locally heating means 3 using, for example, the laser or the cooling means 4 is accurately maintained. In particular, when the glass film G is conveyed under a state of being held by attraction to the conveyor belt 7, the cleaving work can be performed in a more stable state.

Figure 3:
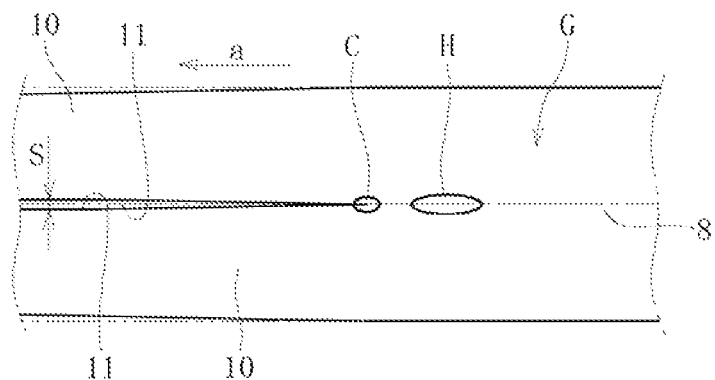
FIG. 3 A main-part plan view of a glass film divided by the cleaving method according to the first embodiment.

By being cleaved as described above, the cleaved glass film G is divided into the plurality of divided glass films 10 (two in this illustration). The divided glass films 10 is continuously conveyed in the predetermined conveying direction "a" by the plurality of conveying rollers 9 positioned on a downstream side of the conveyor 6. In this state, the cleaved surfaces 11 of the divided glass films 10 are significantly close to each other in a width direction, and hence there is a risk that the cleaved surfaces 11 interfere with each other by relative movement. As a countermeasure, the plurality of conveying rollers 9 for conveying the divided glass films 10 constitute the clearance forming means 5. In accordance with conveyance of the divided glass films 10, a predetermined widthwise clearance is formed between the divided glass films 10. Specifically, as illustrated in FIG. 4, when the widthwise end portions of the divided glass films 10 are supported by the plurality of conveying rollers 9 constituting the clearance forming means 5, the divided glass films 10 are distorted by their own weights, with the result of being curved along the width direction. When the divided glass films 10 are curved in the width direction as described above, both widthwise end portions 10a of each of the divided glass films 10 move toward a widthwise central region 10b. By an amount of the movement, a predetermined widthwise clearance S is formed between both the divided glass films 10. In this embodiment, the glass film G or the divided glass films 10 are conveyed at a predetermined speed in the predetermined conveying direction "a", and hence further curved along the width direction by the conveying rollers 9 in accordance with conveyance. As a result, as illustrated in FIG. 3, the widthwise clearance between the divided glass films 10 adjacent to each other in the width direction is also widened gradually toward the downstream side of the conveying direction "a". Thus, at a position farther by a predetermined distance in the conveying direction "a" than a position at which conveyance by the conveying rollers 9 is started, the widthwise clearance S having a size capable of substantially preventing the divided glass films 10 from interfering with each other is secured in subsequent processes of the conveying step.

Figure 2:
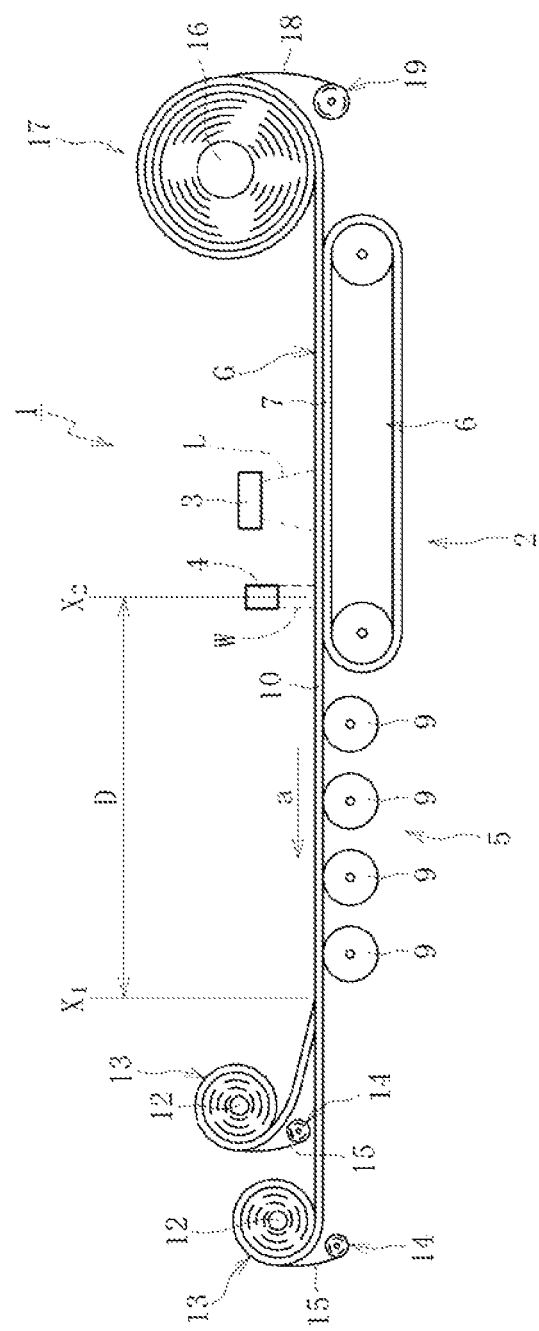
FIG. 2 A schematic side view illustrating an entire structure of the cleaving apparatus according to the first embodiment.

After that, as illustrated in FIGS. 1 and 2, the divided glass films 10 adjacent to each other are conveyed (start to be diverted) in directions of being separated into a front and rear direction of the glass film G without being changed in widthwise relative position, and rolled into roll shapes respectively around two roll cores 12 arranged on a downstream side of the conveying rollers 9 (conveyance means 2). In this way, by starting diversion of the divided glass films 10 (separation work) after forming the predetermined widthwise clearance S between the divided glass films 10 adjacent to each other, the cleaved surfaces 11 of the divided glass films 10 are avoided as much as possible from interfering with each other, for example, by rubbing against each other. As a result, occurrence of minute defects can be suppressed. Thus, it is possible to reduce a risk that existence of the minute defects leads to breakage of the divided glass films 10 at the time of conveyance or the above-mentioned rolling after dividing. With this, two glass-film rolls 13 can be obtained as finished products at a high yield.

Further, during the above-mentioned processes, when a diversion start position of the divided glass films 10, in other words, a separation start position X1 is separated from a position X2 at which the cleaved surfaces 11 start to be formed (cleaving start position X2) by a distance 50 times or more as large as a thickness dimension of the glass film G in the conveying direction "a", during the above-mentioned separation work, a bending stress generated by changing the conveying direction of the divided glass films 10 is prevented from substantially reaching the cleaving start position X2. Thus, the cleaving can be stably performed. In this embodiment, the plurality of conveying rollers 9 as the clearance forming means 5 are arranged on the downstream side in the conveying direction "a" relative to the cleaving start position X2, and the separation start position X1 is provided on a further downstream side of the conveying rollers 9. Thus, a distance D between the positions X1 and X2 reliably satisfies conditions regarding the above-mentioned spacing distance. Note that, the above-mentioned distance D is preferably set to be 100 times or more as large as the thickness dimension of the glass film G, more preferably set to be 500 times or more as large as the thickness dimension of the glass film G.

In this embodiment, a track of one divided glass film 10 (divided glass film 10 on a lower right side in FIG. 1) is not changed before or after the above-mentioned separation step, and only a track of another divided glass film 10 (divided glass film 10 on an upper left side in FIG. 1) is changed upward relatively to the track of the one divided glass film 10. In this way, the divided glass films 10 are conveyed in the above-mentioned directions. However, as a matter of course, the divided glass films 10 may be conveyed in the above-mentioned directions with the tracks of both the divided glass films 10 being changed.

Further, as illustrated in FIG. 2, in this embodiment, under a state in which protective sheets 15 drawn out of protective-sheet roll bodies 14 are overlapped on the rear surface sides (or front surface sides) of the respective divided glass films 10, the divided glass films 10 are rolled around the roll cores 12. In some cases, the protective sheets 15 may be omitted.

Further, as illustrated in FIG. 2, the cleaving apparatus 1 according to the first embodiment may further include a source glass-film roll 17 which is formed by rolling the uncleaned glass film G into a roll shape around a roll core 16 and provided on an upstream side of the conveyor 6. The glass film G drawn out of the source glass-film roll 17 may be continuously conveyed along the horizontal conveying direction "a" by the conveyor 6. Note that, in this embodiment, a protective sheet 18 is overlapped in advance on a rear surface side (or front surface side) of the glass film G rolled as the source glass-film roll 17. When the glass film G is drawn out of the source glass-film roll 17, the protective sheet 18 is peeled off from the rear surface (or front surface) of the glass film G while being rolled around a protective-sheet roll body 19.

Hereinabove, description is made of an embodiment of the cleaving method for a glass film and the cleaving apparatus for a glass film according to the present invention. As a matter of course, the cleaving method and the cleaving apparatus are not limited to the mode exemplified above, and may be used in any mode without departing from the scope of the present invention.

For example, in the clearance forming means 5, when the divided glass films 10 are supported at predetermined widthwise positions by the plurality of conveying rollers 9, as a matter of course, a configuration other than that in the example illustrated in FIG. 4 may be employed. In the following, description is made of an example (modification) of the configuration with reference to the drawings.

Figure 5:
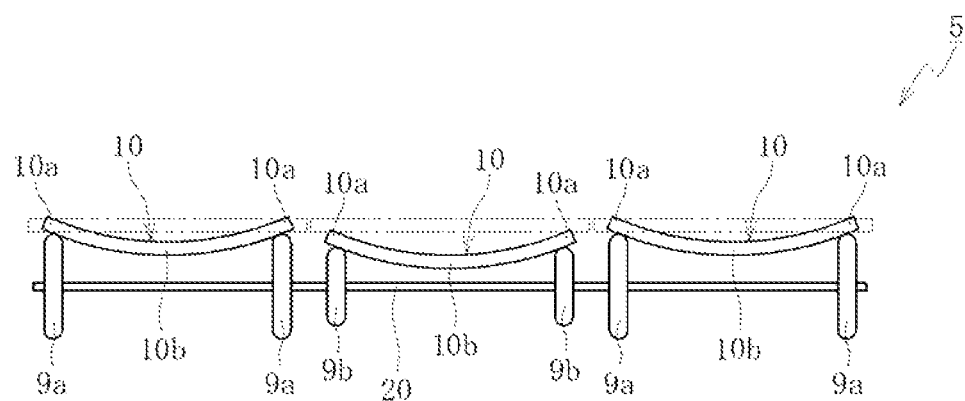
FIG. 5 A main-part sectional view illustrating another example of the step of forming a predetermined widthwise clearance at the cleaving position of the glass film.

FIG. 5 illustrates the configuration of the clearance forming means 5 according to another example in which the glass film G can be divided into three by the cleaving method according to the first embodiment. The clearance forming means 5 includes a plurality of conveying rollers 9a and 9b for conveying glass films 10 divided into three in the width direction, toward the conveying direction "a" (refer to FIG. 1) while supporting the widthwise end portions 10a of each of the divided glass films 10. Specifically, six conveying rollers 9a and 9b in total per the three divided glass films 10, in other words, two per each of the three divided glass film 10 are arranged in the width direction. Of those, the second conveying rollers 9b for supporting widthwise central divided glass film 10 are set to be smaller in roller diameter than the first conveying rollers 9a for supporting the divided glass films 10 positioned on both widthwise sides of the widthwise central divided glass film 10. With this, the predetermined widthwise clearances S are formed between the adjacent divided glass films 10, and both the widthwise end portions 10a of the widthwise central divided glass film 10 can be shifted in a thickness direction thereof (vertical direction in this case). Thus, the cleaved surfaces 11 are avoided from interfering with each other with a high possibility. Further, by forming the conveying rollers 9a and 9b with the same rotary shaft members 20, the clearance forming means 5 can be simplified. Note that, when the clearance forming means 5 according to this mode is used, for the purpose of preventing the cleaved surfaces 11 which come significantly close to each other in the width direction from rubbing against each other when the divided glass films 10 are transferred from the conveyor 6 to the conveying rollers 9a and 9b (in particular, to the widthwise-central second conveying rollers 9b), it is preferred to first convey and support the above-mentioned three divided glass films 10 with use of the conveying rollers 9 illustrated in FIG. 4 each having the same diameter, and then transfer the divided glass films 10 onto the clearance forming means 5 (conveying rollers 9a and 9b) illustrated in FIG. 5 at the time point when widthwise clearances are formed to some extent.

Figure 6:
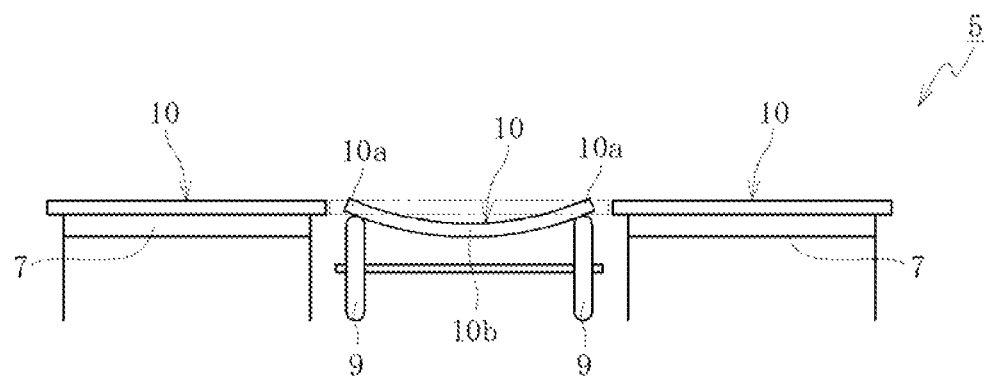
FIG. 6 A main-part sectional view illustrating still another example of the step of forming a predetermined widthwise clearance at the cleaving position of the glass film.

As a matter of course, the widthwise end portions 10a of all the divided glass films 10 obtained by cleaving in the width direction are not necessarily supported by the rollers. As long as widthwise clearances each having a size required for performing subsequent processes in conveyance without failures can be secured, it is possible to support the widthwise end portions 10a and 10a of only part of the divided glass films 10 by the rollers, an example of which is illustrated in FIG. 6. The clearance forming means 5 illustrated in FIG. 6 includes conveying rollers 9 for supporting the widthwise end portions 10a of only the widthwise central one of the glass films 10 that have been divided into three by the cleaving method according to the first embodiment. Other divided glass films 10 on both the widthwise sides are each surface-supported over an entire widthwise region thereof by the conveyor belt 7 (or a belt conveyor including the conveyor belt 7) having the same height as that of the conveyor 6 (refer to FIGS. 1 and 2).

Figure 7:
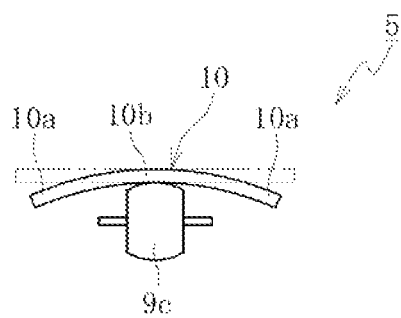
FIG. 7 A main-part sectional view illustrating yet another example of the step of forming a predetermined widthwise clearance at the cleaving position of the glass film.

Further, in the description above, description is made of a case where the clearance forming means 5 is formed of the conveying rollers 9 (9a and 9b) for supporting the widthwise end portions 10a of the divided glass films 10. In this context, for example, the clearance forming means 5 may be formed so that only the widthwise central region 10b of each of the divided glass films 10 is supported by the roller, an example of which is illustrated in FIG. 7. A conveying roller 9c illustrated in FIG. 7 exhibits a substantially drum-like shape having a central region in a rotary-shaft direction slightly larger in diameter than both end portions thereof, and supports the widthwise central region 10b of the divided glass film 10 obtained by cleaving in the width direction. When the clearance forming means 5 including such conveying roller 9c is used, the divided glass film 10 supported thereby is distorted in a direction of projecting to a side opposite to a supported surface, and hence is curved along the width direction. Accordingly, also in this case, both the widthwise end portions 10a of the divided glass film 10 supported as described above move toward the widthwise central region 10b. As a result, widthwise clearances corresponding to the moving amount are formed between the adjacent divided glass films 10.

Figure 8:
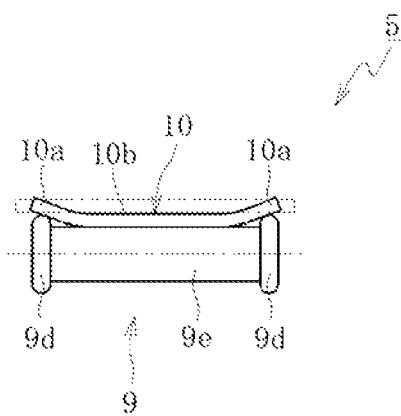
FIG. 8 A main-part sectional view illustrating yet another example of the step of forming a predetermined widthwise clearance at the cleaving position of the glass film.

Still further, in the description above, description is made of a case where the clearance forming means 5 is formed so that parts of the widthwise region of the divided glass film 10 are supported by the rollers. In this context, as a matter of course, the clearance forming means 5 may be formed so that substantially the entire widthwise region of the divided glass film 10 is supported by the rollers, an example of which is illustrated in FIG. 8. The conveying roller 9 illustrated in FIG. 8 integrally includes large diameter portions 9d for supporting the widthwise end portions 10a of the divided glass film 10 as a supported body and a small diameter portion 9e which is smaller in diameter than the large diameter portions 9d and supports a large part of the divided glass film 10 except the widthwise end portions 10a. In this way, by supporting the divided glass film 10 with the conveying roller 9 integrally including the parts 9d and 9e each having a different roller diameter, the widthwise end portions 10a of one of the adjacent divided glass films 10 are deformed with a predetermined curve. With this, a predetermined widthwise clearance can be formed between the one of the adjacent divided glass films 10 and the other divided glass films 10. As a matter of course, rollers each having a diameter corresponding to that of the large diameter portion 9d may be arranged on both widthwise sides of a roller having a diameter corresponding to that of the small diameter portion 9e in a manner that rotary shafts of all the rollers align with each other. In this case, by being enabled to be rotatable independently of each other, the three rollers are rotated respectively in accordance with the conveying speed of the divided glass film 10, and hence there is a smaller risk that the conveying roller 9 and the divided glass film 10 rub against with each other compared to the case where the conveying roller 9 is integrally rotated.

Note that, in any cases employing the above-mentioned modes, it is preferred to set roller diameters, shapes of outer peripheral surfaces to serve as support surfaces, widthwise support positions, and the like such that a difference in positions in the thickness direction (in this case, positions in the vertical direction) between the widthwise end portions 10a and the widthwise central region 10b of the divided glass film 10 in a state of being supported by the conveying rollers 9 (9a to 9e) is one time or more as large as the thickness dimension of the glass film G and 0.01 times or less as large as the widthwise dimension of the divided glass film 10. This is because, when the difference in the positions in the thickness direction between the widthwise end portions 10a and the widthwise central region 10b is less than one time as large as the thickness dimension of the glass film G, it is impossible to eliminate a risk that the cleaved surface 11 of the curved one divided glass film 10 and the cleaved surface 11 of the another divided glass film 10 adjacent to the curved one divided glass film 10 come into contact with each other. This is also because, when the difference in the positions in the thickness direction is larger than 0.01 times as large as the widthwise dimension of the divided glass film 10, the divided glass film 10 excessively warps in the width direction, and hence it is difficult to further curve the divided glass film 10 in the curved state along the conveying direction.

Yet further, in the description above, description is made of a case where the clearance forming means 5 is formed of the conveying rollers 9 (9a to 9e) for supporting the divided glass film 10, in other words, a case where the clearance forming means 5 doubles as the conveyance means 2. Alternatively, as a matter of course, the clearance forming means 5 can be provided separately from the conveyance means 2.

Figure 9:
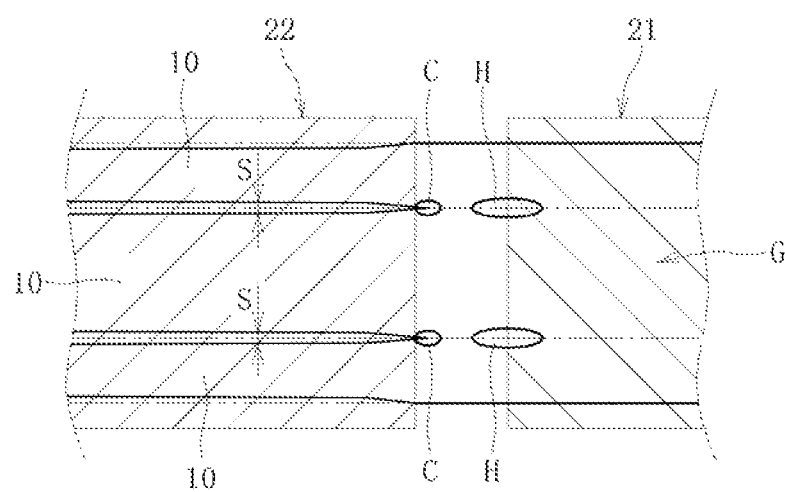
FIG. 9 A main-part plan view of a glass film, illustrating a cleaving method according to a second embodiment of the present invention, the glass film being divided by the cleaving method.

FIG. 9 is a schematic view illustrating a cleaving method for a glass film according to a second embodiment of the present invention, in which the glass film G cleaved by the cleaving method is viewed in plan view. As illustrated in FIG. 9, in this embodiment, the clearance forming means 5 includes an entire-region heating device (not shown) for heating the entire widthwise region of the uncleaved glass film G with use of the thermal stress generated by localized heating and cooling, and an entire-region cooling device (not shown) for cooling the entire widthwise region of all the divided glass films 10 obtained by the cleaving. The heating and cooling devices generate a heated region 21 over the entire widthwise region of the uncleaved glass film G and a cooled region 22 over the entire widthwise region of all the cleaved divided glass films 10. Then, by setting a temperature difference between the heated region 21 and the cooled region 22 thus generated to a predetermined value or to fall within a predetermined range, a temperature of the glass film G (or divided glass films 10 formed of the glass film G) is reduced by a predetermined value before and after the cleaving. In this way, the divided glass films 10 are subjected to thermal shrinkage in the width direction correspondingly to an amount of the temperature decrease (from positions illustrated by two-dot chain lines to positions illustrated by solid lines in FIG. 9). As a result, the predetermined widthwise clearances S are formed between the divided glass films 10 adjacent to each other.

As described above, when the predetermined widthwise clearance is formed by subjecting the divided glass films 10 to thermal deformation, the widthwise clearance S can be formed without bringing any member into contact with the glass film G (or the divided glass films 10 of the glass film G). Thus, it is possible to avoid occurrence of flaws and adhesion of foreign matter with respect to the divided glass films 10. Further, the glass film G can be conveyed up to the separation start position X1 of the divided glass films 10 by the conveyor 6, and hence the conveying rollers 9 can be omitted so as to simplify the conveyance means 2. As a matter of course, by combining the cleaving method according to the first embodiment (technique for forming a widthwise clearance by curving) with the cleaving method according to this embodiment (second embodiment) (technique for forming a widthwise clearance by thermal shrinkage), a larger widthwise clearance S can be formed.

Note that, in this illustration, the heated region 21 and the cooled region 22 are formed over the entire widthwise region of the glass film G, but alternatively, for example, when the glass film G is divided into three by cleaving as in the illustration, the cooled region 22 may be formed over an entire widthwise region of only the widthwise central divided glass film 10. Further, when the glass film G is cleaved, for example, during a forming step described below, cleaving may be performed in a phase in which a temperature of the glass film G has reached a predetermined value (for example, at approximately 100° C.), and then the above-mentioned cooled region 22 may be provided. Also in this way, the temperature of the glass film G (or divided glass films 10 formed of the glass film G) can be reduced by a predetermined value. With this, the predetermined widthwise clearance S can be formed. Further, in this case, the heated region 21 needs not be formed.

In the description above, the predetermined widthwise clearance S is formed by uniformly heating the uncleaned glass film G and by uniformly cooling the divided glass films 10. Alternatively, a temperature gradient may be set in the thickness direction of the divided glass films 10 by heating one surface (front surface or rear surface) of each of the divided glass films 10 and by cooling another surface thereof. With this, the divided glass films 10 are deformed into the shapes as illustrated in FIG. 4 by thermal expansion and thermal shrinkage, and hence the predetermined widthwise clearance S can be formed also by this method.

Further, other than the methods described above, for example, a method of forming a predetermined widthwise clearance by chemical dissolution of the cleaved surfaces can be conceived. Specifically, the following method can be cited as an example: jetting an aqueous solution of hydrofluoric acid or an aqueous solution of hydrofluoric-sulfuric acid, which has a predetermined concentration (approximately 10%), through a nozzle toward between the cleaved surfaces 11 of the divided glass films 10 adjacent to each other, to thereby form a widthwise clearance between the cleaved surfaces 11 and widen the widthwise clearance. This technique is more effective when being used in combination with any one or both the clearance forming means 5 described hereinabove.

Figure 10:
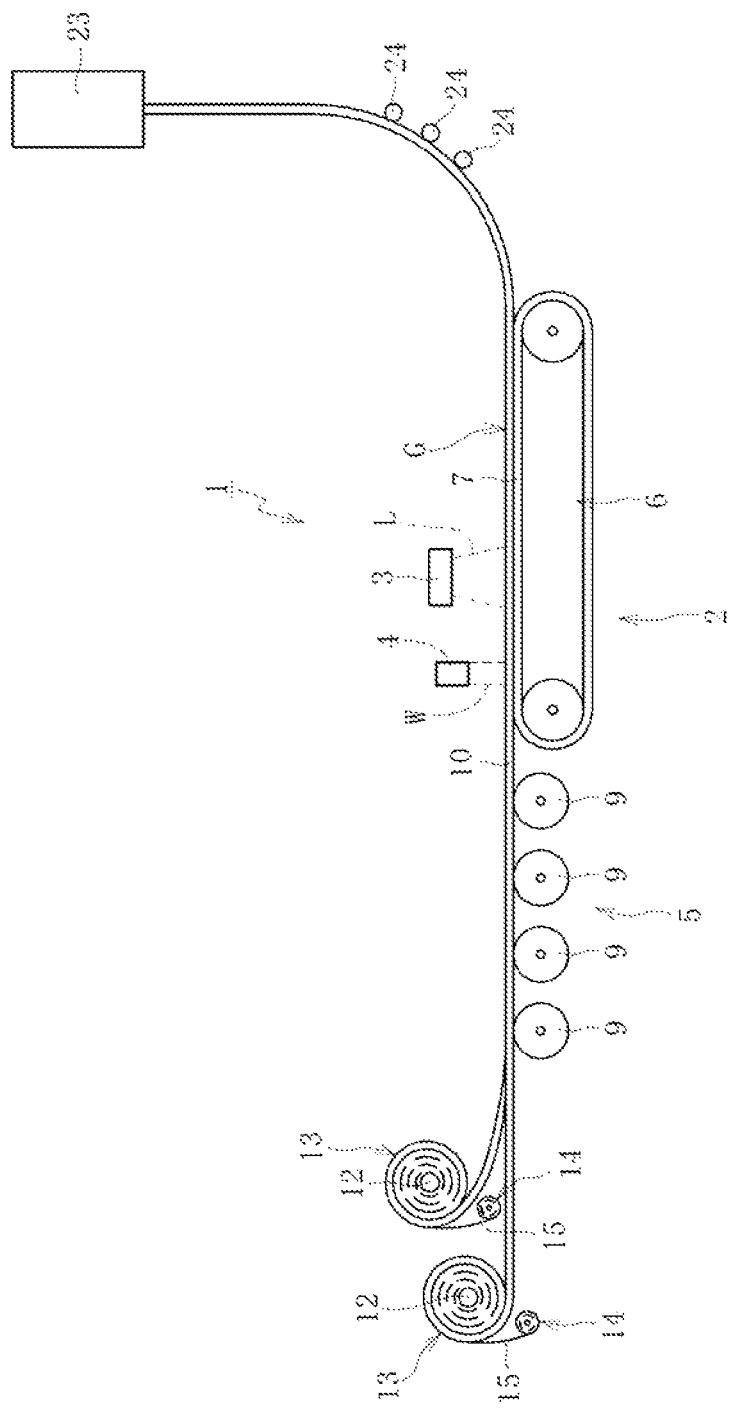
FIG. 10 A schematic side view of the cleaving apparatus, illustrating a modification of a method of continuously feeding the glass film.
Figure 11:
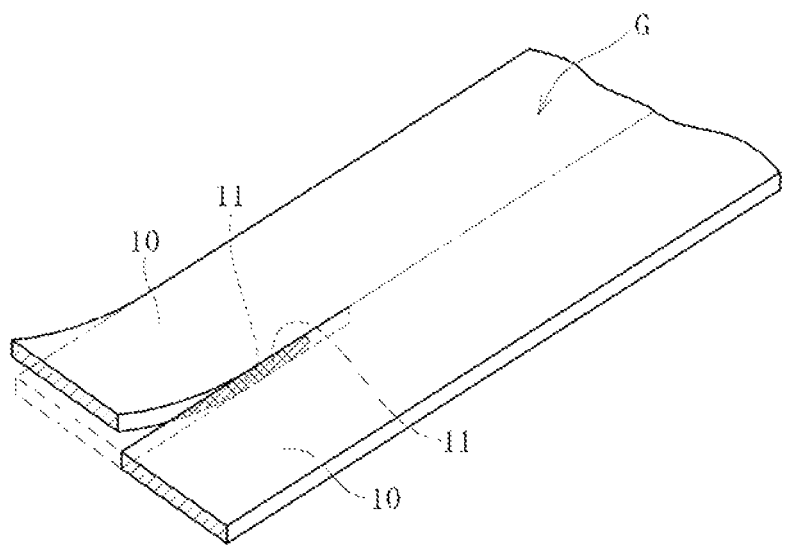
FIG. 11 A main-part perspective view of a glass film, illustrating problems with conventional technologies.

Further, in the above-mentioned embodiment, description is made of a case where the glass film G is continuously fed by being drawn out of the source glass-film roll 17. Alternatively, as illustrated in FIG. 10, the glass film G drawn out downward of a forming device 23 for forming the glass film G by a downdraw method with respect to molten glass (not shown) (overflow downdraw method, slot downdraw method, or the like) or by a downdraw method (redraw method) of reheating a glass sheet may be smoothly curved by a plurality of conversion rollers 24, and then conveyed in a lateral direction with respect to the conveyor 6.

Still further, in the above-mentioned embodiment, description is made of a case where all the divided glass films 10 obtainedby cleaving are finally rolled into roll shapes as products. In this context, as a matter of course, the cleaving method according to the present invention is applicable to cutting and separation of end edge portions (what is called ear portions) of the glass film G.

REFERENCE SIGNS LIST 1 cleaving apparatus
2 conveyance means
3 locally heating means
4 cooling means
5 clearance forming means
6 conveyor
7 conveyor belt
8 preset cleaving line
9, 9a, 9b, 9c conveying roller
9d large diameter portion
9e small diameter portion
10 divided glass film
10a widthwise end portion
10b widthwise central region
11 cleaved surface
12 roll core
13 glass-film roll
14 protective-sheet roll body
15 protective sheet
16 roll core
17 source glass-film roll
18 protective sheet
19 protective-sheet roll body
20 rotary shaft member
21 heated region
22 cooled region
23 forming device
24 conversion roller
a conveying direction
C locally cooled region
D distance
G glass film
H locally heated region
L laser
S widthwise clearance
W cooling water
X1 separation start position
X2 cleaving start position

The invention claimed is:
1. A method comprising:
conveying a glass film forward in a predetermined conveying direction;
cleaving, during the conveying of the glass film, the glass film continuously along a preset cleaving line extending in the predetermined conveying direction by a thermal stress generated through localized heating performed along the preset cleaving line and through cooling of a region heated by the localized heating;
dividing of the cleaved glass film in a width direction of the glass film into adjacent divided glass films, each of the adjacent divided glass films having longitudinally-extending inner side edges facing inwardly toward each other and longitudinally-extending outer side edges facing outwardly away from each other; and
bending at least one of the adjacent divided glass films to form, after the dividing, a widthwise space between the adjacent divided glass films while continuously conveying all of the adjacent divided glass films in the predetermined conveying direction, such that the longitudinally-extending outer side edge and the longitudinally-extending inner side edge of the at least one of the adjacent divided glass films move toward each other, and such that the at least one of the adjacent divided glass film is curved in a cross section orthogonal to the predetermined conveying direction,
wherein the bending is carried out by supporting widthwise ends of the at least one of the adjacent divided glass films by a roller conveyor comprising a plurality of conveying rollers, each of the plurality of conveying rollers comprising two rollers provided coaxially on a rotary shaft, the two rollers having identical outer diameters, and the two rollers being separated from each other in a longitudinal direction of the rotary shaft so as to support the widthwise ends of the at least one of the adjacent divided glass films such that the at least one of the adjacent divided glass films is curved through distortion by its own weight to maintain a space between an outer circumferential surface of a widthwise central region of the rotary shaft and a widthwise central region of the at least one of the adjacent divided glass films,
forming the widthwise space to become bigger, in a widthwise direction, as the adjacent divided glass films move forwardly in the predetermined conveying direction until the widthwise space becomes 0.02 mm or more; and
diverting the adjacent divided glass films, after the forming of the 0.02 mm or more widthwise space, while continuing the conveying in the predetermined conveying direction, such that a first of the adjacent divided glass films is offset forward of a second of the adjacent divided glass films;
wherein the diverting is carried out at a first location, along the predetermined conveying direction, forward of a second location at which the forming of the widthwise space is carried out along the predetermined conveying direction;
wherein the forming of the widthwise space is carried out at the second location, along the predetermined conveying direction, forward of a third location at which the cleaving is carried out; and
wherein, after the diverting of the adjacent divided glass films is started, the supporting the widthwise ends of the at least one of the adjacent divided glass films by the roller conveyor is finished to cancel the curved state of the at least one of the adjacent divided glass films whereby the at least one of the adjacent divided glass films returns to a flat state.

2. The method according to claim 1, wherein the bending is carried out by supporting only the widthwise ends of the at least one of the adjacent divided glass films by the roller conveyor.

3. The method according to claim 1, further comprising subjecting the at least one of the divided glass films obtained by the cleaving to thermal deformation.

4. The method according to claim 1, wherein the diverting of the adjacent divided glass films is started at a position separated by a distance 50 times or more as large as a thickness dimension of the glass film from a position at which the cleaving is started.

5. The method according to claim 2, wherein the diverting of the adjacent divided glass films is started at a position separated by a distance 50 times or more as large as a thickness dimension of the glass film from a position at which the cleaving is started.

6. The method according to claim 3, wherein the diverting of the adjacent divided glass films is started at a position separated by a distance 50 times or more as large as a thickness dimension of the glass film from a position at which the cleaving is started.

7. The method according to claim 1, wherein the forming the widthwise space is carried out by curving two of the adjacent divided glass films which are immediately next to each other along the width direction such that the two adjacent divided glass films are curved in the cross section orthogonal to the predetermined conveying direction.

8. The method of claim 1, further comprising: after the at least one of the adjacent of the adjacent divided glass films returns to a flat state, rolling at least one of the adjacent divided glass films into a roll.

9. The method of claim 1, further comprising: after the at least one of the adjacent of the adjacent divided glass films returns to a flat state, rolling each of the adjacent divided glass films into a roll.

* * * * *